Figure 1:
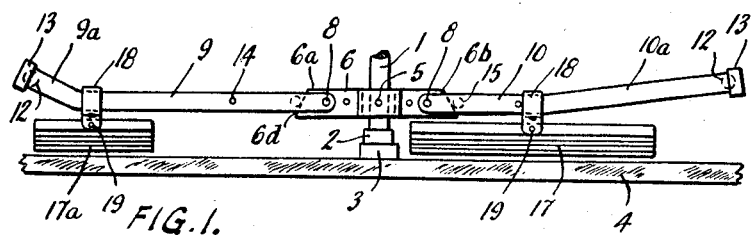

July 5, 1960

W. REED-LETHBRIDGE 2,943,342

WINDSCREEN WIPERS

Filed Feb. 7, 1958

Inventor
WILLIAM REED-LETHBRIDGE

By Irwin S. Thompson
Attorney

United States Patent Office 2,943,342
Patented July 5, 1960

2,943,342

WINDSCREEN WIPERS

William Reed-Lethbridge, 47 Fowlds Ave., Sandringham, Auckland, New Zealand

Filed Feb. 7, 1958, Ser. No. 713,917

Claims priority, application New Zealand Mar. 11, 1957

5 Claims. (Cl. 15—250.19)

This invention relates to windscreen wipers of the rotary type as described in the specification of my previous U.S.A. Patent No. 2,787,802, dated April 9, 1957, the objects of the present invention being the provision of improvements in and modifications of the wiper which will enable the elimination of the link or stirrup and the springs used for causing the wiper blades to bear on the windscreen and enable the obtaining of improved flexibility of the action of the wiper under varying conditions.

In my previous patent, one wiper blade was pivotally connected substantially directly to the rod and the other pivotally connected to a link or stirrup which in turn was pivotally connected to the rod which was rigid or substantially rigid throughout its length, spring means of various forms being applied between the link or stirrup and the rod to adjustably yieldingly resist the action of centrifugal force which tends to move the wiper blade on the link or stirrup towards the windscreen surface.

While this apparatus can work satisfactorily, it has been found that springs between the link or stirrup and the rod can be a cause of difficulty because of their variability one as against another of seemingly identical springs, spring tension being a vital factor in the obtaining of good working operation of the wiper in that springs which are too weak or are too strong can cause difficulty.

Furthermore, a difficulty occurs in balancing the wiper blades to opposite sides of the centre owing to the outward movements of the blade on the link or stirrup away from the centre, because the further outward this blade moves from the centre, the greater must be the weight to be counterbalanced, so that there is a tendency for the complete wiper apparatus to be put out of the desirable perfect balance because of the movement of the stirrup.

My present invention has accordingly been devised to give an improved simplified action which avoids the use of springs for pressing the wiper blade against the windscreen, centrifugal force alone being used to cause the blades to effect maintained wiping action with the windscreen, the blades also being given greater independence of each other so that they can each more readily effect the wiping of the surfaces over which they pass, of which the surface swept by the more central blade may be more flat than that swept by the outer blade, as may be required on curved or bent windscreens.

Broadly the invention comprises an improved windscreen wiper wherein a central rotary head or stub shaft has rocker means pivotally carried thereby, rod means being pivotally secured to said rocker means to extend radially outward from opposite sides thereof and such rods having set or bent portions extending outwardly away from the windscreen, counterweight means being applied to the free ends of such rods and wiper blades pivotally secured to each of the rods.

Figure 2:
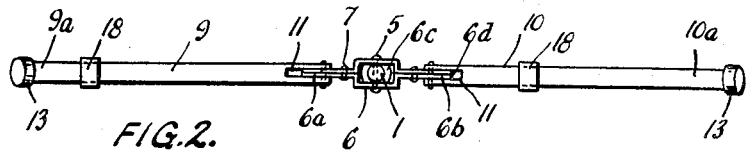
Figure 3:
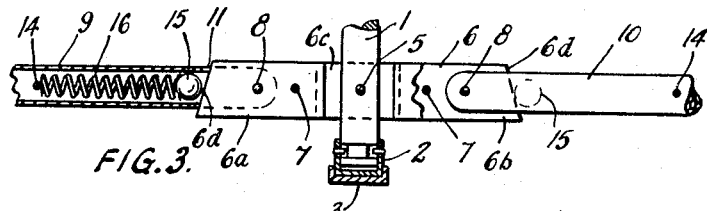
Figure 4:
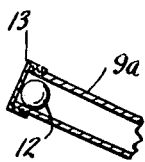
Figure 5:
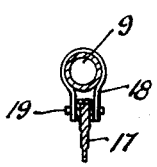

In describing the invention, reference will be made to the accompanying drawing in which:

Figure 1 shows an elevation of the improved wiper,
Figure 2 is a plan view of Fig. 1,
Figure 3 is an enlarged partial sectional elevation of the wiper,
Figure 4 is an enlarged sectional elevation of an end of a rod and
Figure 5 is a cross sectional elevation of a wiper blade and its carrier means.

In the invention, the apparatus comprises as previously a central head portion or stub shaft 1 adapted for rotation within a collar or the like 2 which has a rubber button or the like 3 secured at its bottom end adapted for resting on the windscreen or like 4, the stub shaft 1 at its top end being suitably adapted to receive a rotary drive (not shown).

A pivot or fulcrum pin 5 projects from opposite sides of the shaft 1 to pivotally carry a rocker 6 so that arm portions 6a and 6b of the rocker 6 of equal length will extend away from opposite sides of the head or shaft 1, the central portion of the rocker 6 being divided to present a hole 6c therein through which the shaft 1 extends with some clearance, the ends of the arms 6a and 6b of this rocker 6 having inclined surfaces or ramps 6d and the rocker 6 is made up of two equal parts (if so desired) secured to each other as by rivets or the like 7.

The opposite arms 6a and 6b of this rocker 6 are therefore substantially parallel with the windscreen 4 on which the button 3 of the head portion 1 bears, but because of being mounted on the fulcrum pin 5, such rocker 6 can swing to one side or the other away from the parallel position.

Secured by pivot pins or the like 8 to near the outer ends of these arms 6a and 6b of the rocker 6 there are tubular rods 9 and 10 with slots 11 in their ends into which the arms 6a and 6b pass, these rods 9 and 10 being straight and substantially parallel with the rocker 6 at their inner ends where they pass from the arms 6a and 6b thereof, but are each provided with angular bends or sets whereby their free ends 9a and 10a extend further away from the windscreen 4 to positions which are located a greater distance from said windscreen 4 than the pin 5 in the shaft 1.

Counterweight means are provided at the free ends 9a and 10a of the rods 9 and 10 and these could be weights of any suitable type directly and rigidly secured to the free ends 9a and 10a, but it is preferred that the counterweight means be variable and also capable of free movement of position within the rods 9 and 10.

Therefore the counterweight means preferably comprise one or more metal counterweight balls 12 disposed within each of the tubular rods 9 and 10, free to roll therein between screw-on caps 13 which close the outer ends of the rods 9 and 10 and stop pins or the like 14 which are secured across such rods 9 and 10 in the vicinity of their inner slotted ends.

The slots 11 cut into the inner ends of the rods 9 and 10 are such as to permit only a desired limited amount of free pivotal movement of the rods on the rocker arms 6a and 6b by coming to bear on the ramp ends 6d of such arms 6a and 6b and while such ramp ends 6d are not essential to the working of the apparatus, they present a desirable advantage as enabling the achieving of some degree of yielding restraint on the movements of the rods 9 and 10 in relation to the rocker 6.

Disposed within each of the rods 9 and 10 in the vicinity of the slots 11 thereof, there are ball stops 15 and between these and the stop pin 14 there are compression springs 16 which therefore yieldingly press the balls 15 against the ramps 6d.

As previously, one wiper blade 17 is located on the rod 10 in an inward position near the central head or stub shaft 1, while the other wiper blade 17a is located in an outward position on the rod 9, these blades 17 and 17a being secured to their respective rods 10 and 9 by U supports 18 mounted on the rods, to which U supports 18 the blades 17 and 17a are pivotally attached by a pin or like 19 and thus it will be seen that the previous stirrup has been eliminated and that neither blade 17 or 17a can now effect a movement which would carry it further away from the central head 1, nor can either blade now effect movement towards or away from the rods 9 or 10, which means that in the absence of any change of relative position which would cause change in the action of centrifugal force, the counterweighting will be correct at all times and the whole apparatus can be pre-balanced during manufacture and require no further attention provided the same type of blades are applied when replacement of a blade becomes necessary.

The counterweight balls 12 are such that they will be only small and just sufficient to counteract the weight of the blades 17 and 17a on the arms so that while there may be a long blade 17 on the rod 10 and a short blade 17a on the other rod 9, these counterweight balls 12 will effect a balance of total weight as at opposite sides of the central head or stub shaft 1.

In use or operation, the rotation of the central head or stub shaft 1 effects rotation of the rocker 6 whereby the opposite rods 9 and 10 extending in spoke like manner from the rocker 6 carry the wiper blades 17 and 17a around in inner and outer windscreen wiping circles, the apparatus being adjusted for operation at a certain speed of rotation which will give the best results.

Now the positions of the wiper blades 17 and 17a is such that the rotary action will tend to move these by centrifugal force away from the windscreen 4, but the position of the counterweights 12 is such as to not only offset this outward action of the wiper blades 17 and 17a but to have some greater degree of action whereby, at the set speed of rotation, the counterweights 12 cause a greater thrust moving the rods 9 and 10 and the wiper blades 17 and 17a towards the windscreen.

The result is that the wiper blades 17 and 17a effect just the right amount of pressure on the windscreen 4 so as to enable a smooth drive and what may be called a floating action of the blades 17 and 17a and in view of the rocker 6 being movable on its pivot 5 and the rods 9 and 10 in turn each independently movable on the rocker 6, the wiper blades 17 and 17a can also effect independent movements whereby they do not affect the actions of each other.

When the wiper is stationary, the action of the ball stops 15 on the ramp ends 6d of the arms 6a and 6b is such as to cause the rods 9 and 10 to be moved outwardly away from the windscreen 4 a small amount which will cause the wiper blades 17 and 17a to be free from any pressure against the windscreen 4 as shown in Fig. 1, so that when the wiper starts to rotate, these blades 17 and 17a do not cause any substantial restraint to the rotation until, on approaching the required running speed of rotation, centrifugal force overcomes the resistance of the ball stops 15 whereby the blades 17 and 17a effect the contact with the windscreen 4.

While the apparatus is in operation, the counterweight balls 12 naturally travel outwardly within the tubular rods 9 and 10 as far as they can go, but when the apparatus stops its rotation, the counterweight balls 12 in the rod 9 or 10 which is uppermost, will run down within same from the screw-on cap 13 to come to rest against the stop pin 14 of such rod, this tending to cause the wiper to stop in a vertical position on the vertically or substantially vertically disposed windscreen 4.

The construction is also such that, while the larger wiper blade 17 will sweep over a main circle of windscreen 4 which will generally be flat, the smaller wiper blade 17a will effect sweeping over an annular area which is outward and connects up with the inner circle and in some cases the surface swept may have some degree of curve therein, the freedom of movement permitted by the present mechanism enabling the blade 17a to effectively sweep a surface of which part may be curved and part flat.

I claim:
1. An improved windshield wiper comprising a central rotary stub shaft, rocker means extending transversely of said shaft and pivotally secured thereto by pivot means extending transversely of said shaft and said rocker means, rod means pivotally secured at diametrically opposed points relative to said shaft to said rocker means about pivots substantially parallel to said pivot means, said rod means extending radially outwardly on opposite sides of said shaft and having bent portions extending away from the windshield, counterweight means carried by the outer ends of said rod means, and a wiper blade pivotally secured to each of the rod means, said rocker means comprising a rocker member with a central hole therein through which the stub shaft passes, said pivot means comprising a fulcrum pin passing across said hole in the rocker member and through said stub shaft, said rocker member having arms extending on opposite sides thereof.

2. An improved windshield wiper as claimed in claim 1 wherein the rod means are tubular and have slots formed in the inner ends thereof into which the arms of the rocker member extend.

3. An improved windshield wiper as claimed in claim 2 wherein the counterweight means carried by the outer ends of the rod means comprise metal balls contained within the tubular rod means, the outer ends of the rod means being closed by screw-on caps.

4. An improved windshield wiper comprising a central rotary stub shaft, rocker means extending transversely of said shaft and pivotally secured thereto by pivot means extending transversely of said shaft and said rocker means, rod means pivotally secured at diametrically opposed points relative to said shaft to said rocker means about pivots substantially parallel to said pivot means, said rod means extending radially outwardly on opposite sides of said shaft and having bent portions extending away from the windshield, counterweight means carried by the outer ends of said rod means, a wiper blade pivotally secured to each of the rod means, said rocker means comprising a rocker member with a central hole therein through which said stub shaft passes, said pivot means comprising a fulcrum pin passing across said hole in the rocker member and through said stub shaft, said rocker member having arms extending on opposite sides thereof, and means for applying yielding restraint on the movements of the rod means in relation to the rocker means under centrifugal force.

5. An improved windshield wiper as claimed in claim 2, further comprising means for applying yielding restraint on the movements under centrifugal force of the rod means in relation to the rocker means comprising inclined ramps formed on the outer ends of the arms of the rocker member, balls disposed within the slotted ends of the tubular rod means adapted to bear against the ramps, and compression springs disposed within the tubular rod means for pressing the balls against the ramps.

References Cited in the file of this patent

UNITED STATES PATENTS

| | | |
|---|---|---|
| 2,100,055 | Horton | Nov. 23, 1937 |
| 2,161,682 | Rogers | June 6, 1939 |
| 2,540,407 | Reed-Lethbridge | Feb. 6, 1951 |
| 2,691,186 | Oishei et al. | Oct. 12, 1954 |

FOREIGN PATENTS

| | | |
|---|---|---|
| 754,788 | Great Britain | Aug. 15, 1956 |
| 777,094 | Great Britain | June 19, 1957 |